(12) United States Patent
Ardes

(10) Patent No.: US 6,921,479 B2
(45) Date of Patent: Jul. 26, 2005

(54) FLUID FILTER WITH REMOVABLE CENTRAL COMPONENT WITH ADDITIONAL RETAINER

(75) Inventor: Wilhelm Ardes, Ascheberg (DE)

(73) Assignee: Ing. Walter Hengst GmbH & Co. KG, Munster (DE)

( * ) Notice: Subject to any disclaimer, the term of this patent is extended or adjusted under 35 U.S.C. 154(b) by 0 days.

(21) Appl. No.: 09/890,588
(22) PCT Filed: Dec. 1, 2000
(86) PCT No.: PCT/DE00/04299
§ 371 (c)(1),
(2), (4) Date: Nov. 21, 2001
(87) PCT Pub. No.: WO01/39864
PCT Pub. Date: Jun. 7, 2001

(65) Prior Publication Data
US 2002/0134726 A1 Sep. 26, 2002

(30) Foreign Application Priority Data
Dec. 2, 1999 (DE) .................................. 299 21 168 U

(51) Int. Cl.$^7$ .............................................. B01D 35/34
(52) U.S. Cl. ....................... 210/232; 210/440; 210/441; 210/457
(58) Field of Search ................................ 210/130, 136, 210/248, 428, 437, 438, 440, 441, 457, 232; 123/196 A; 285/33, 34, 35, 81, 304, 401, 402, 921; 403/329, 348, 349

(56) References Cited

U.S. PATENT DOCUMENTS

| | | | | |
|---|---|---|---|---|
| 2,407,046 A | * | 9/1946 | Vokes ........................ 210/415 |
| 4,502,954 A | * | 3/1985 | Druffel ....................... 210/136 |
| 4,617,118 A | * | 10/1986 | Smart ......................... 210/232 |
| 4,887,849 A | * | 12/1989 | Briet ........................... 285/91 |
| 5,516,425 A | * | 5/1996 | Brieden et al. ............. 210/232 |
| 5,601,710 A | * | 2/1997 | Yoon et al. ................. 210/232 |
| 5,922,196 A | * | 7/1999 | Baumann ................... 210/232 |
| 6,305,724 B1 | * | 10/2001 | Sampson .................... 285/376 |

FOREIGN PATENT DOCUMENTS

| | | |
|---|---|---|
| DE | 3903675 A1 | 8/1990 |
| DE | 29610290 U1 | 8/1996 |
| DE | 19539918 C1 | 2/1997 |
| DE | 19613101 A1 | 10/1997 |
| EP | 612549 A3 | 8/1994 |
| EP | 612549 A2 | 8/1994 |
| EP | 748646 A2 | 12/1996 |

* cited by examiner

Primary Examiner—Matthew O. Savage
(74) Attorney, Agent, or Firm—Lahive & Cockfield, LLP

(57) ABSTRACT

The invention relates to a fluid filter, especially an oil filter for an internal combustion engine, comprising a filter housing and a central, approximately tubular component which extends into the interior of the filter, said central component engaging in the operating position a projection located on the filter housing and permanently retained in the filter housing, said component being disengageable from said projection and nondestructively removable in said disassembly position from the filter, the component being rotatably mounted around its longitudinal axis within the filter housing, a retaining component (10) being arranged in rotatably restricted fashion within the filter housing, which retaining component in its operating position surrounds and fixes the central component by means of a clamping or locking interference fit, and the central component being rotatable in its disassembly position when the clamping or locking force is exceeded.

2 Claims, 2 Drawing Sheets

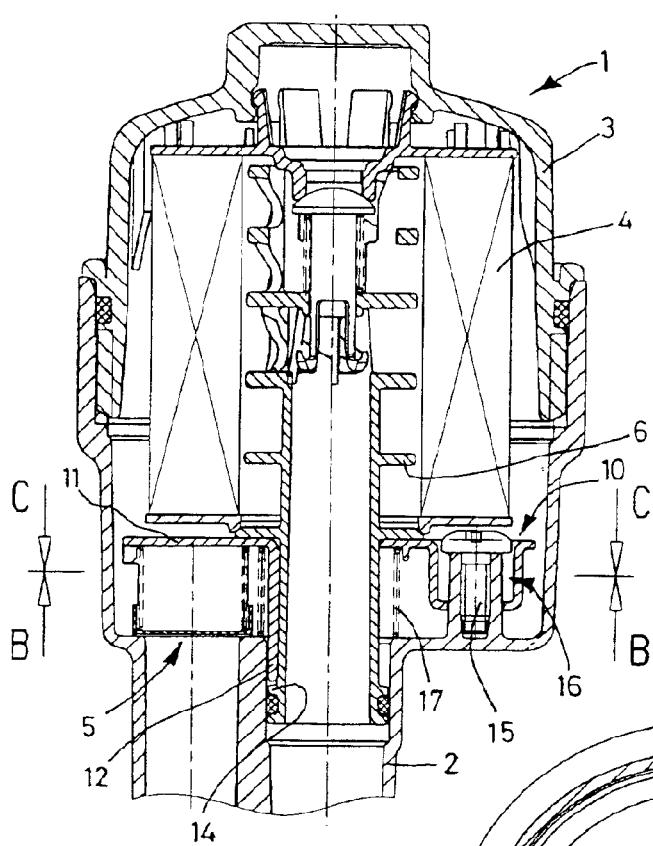
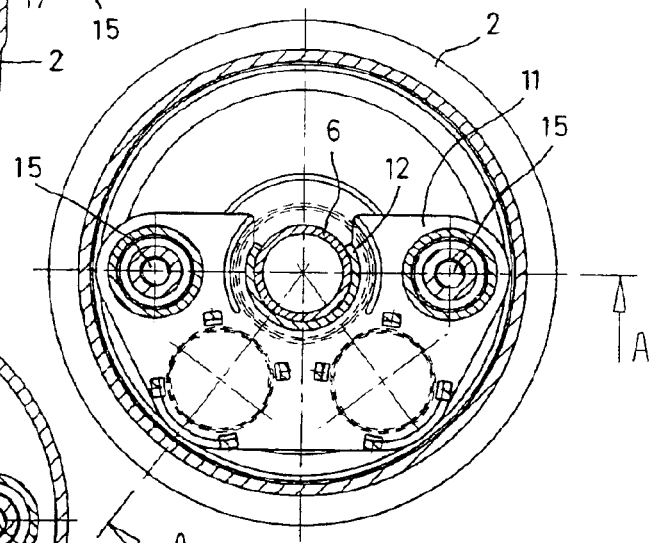
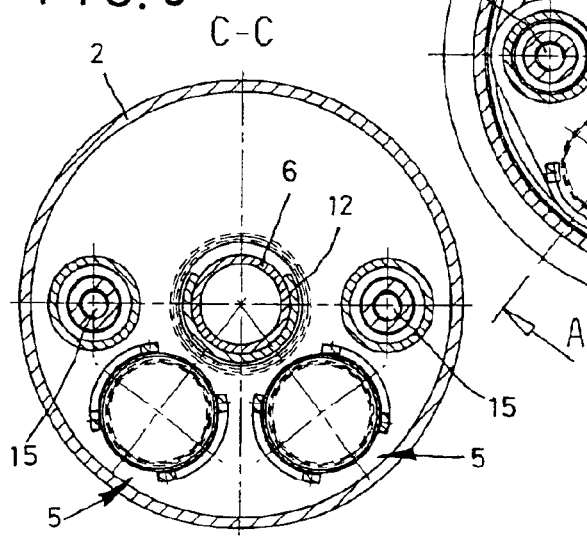

ized central component is installed, as well as with # FLUID FILTER WITH REMOVABLE CENTRAL COMPONENT WITH ADDITIONAL RETAINER

RELATED APPLICATIONS

This application claims priority to PCT International Patent Application No. PCT/DE00/04299, filed Dec. 1, 2000, and German Patent Application No. DE 299 211 68.1, filed Dec. 2, 1999 in Germany. This international patent application was published in German. The contents of the aforementioned applications are hereby incorporated by reference.

BACKGROUND OF THE INVENTION

The present invention relates to a fluid filter suitable for use in an internal combustion engine.

A conventional fluid filter is shown and described in Utility Model application 299 16265.

The central component here is provided with lateral wings which contact projections in the interior of the filter housing and in this way rotationally fix the central component. In response to bending or intentional destruction of these wings, the central component may be pivoted into a rotated position around its rotational axis, in which position it is removable.

SUMMARY OF THE INVENTION

The object of the present invention is to further develop a generic fluid filter such that this filter allows for easy assembly and disassembly of the central component, even given greatly varying filter geometries and correspondingly varied installed conditions within the filter housing.

The invention, in other words, proposes two different approaches: On the one hand, it is possible to arrange the central component to be rotationally fixed. For this purpose, the central component is surrounded by a retaining component which in turn is arranged in a rotationally fixed manner within the filter housing. Specifically, in connection with irregularly contoured filter housings, the retaining component may be designed such that it may be mounted only axially in the filter housing and is not rotatable—even rotatable by a few angular degrees. On the other hand, the central component is essentially free to rotate within the filter housing. However, due to the matching contouring between retaining component and central component, the central component is fixed so as not to rotate, or to rotate only to a limited extent, within the filter housing. The central component is axially secured here in the familiar fashion, e.g., by spring-elastic, outwardly projecting engagement hooks which engage the matching projections in the filter housing. Since the projections, as well as the engagement hooks, do not extend around the entire circumference of the filter housing or central component, the central component may be rotated by partially turning it around its longitudinal axis from its operating position to the disassembly position in which its engagement hooks may be axially displaced between two adjacent projections of the filter housing such that the central component may be removed from the filter housing in this disassembly position. The retaining component assembly itself does not need to be additionally fixed within the filter housing: It is movable only in an axial direction, and both components are axially fixed in the axial direction due to the connection with the central component and the axial fixation of the latter, e.g., by means of the above-mentioned spring-elastic claws. The rotational fixation is in turn achieved by appropriate contouring between the central component and the retaining component and the rotationally restricted mounting of the retaining component within the filter housing.

The forces needed to rotate the central component relative to the retaining component from its operating position into the disassembly position are set so high that lesser rotational forces, such as those which occur when the cap of the filter housing is screwed on or unscrewed and which are at least partially transferred to the central component, cannot result in any rotation of the central component relative to the retaining component. If required, it is even possible to provide special keyed surfaces or similar features on the central component such that rotation of the central component relative to the retaining component may be enabled only with the aid of a tool.

An alternative approach of the invention is not to have the central component engage a projection which is provided directly on the filter housing. This approach allows the filter housing to be fabricated inexpensively without the requirement of an undercut. The projection engaging the central component may instead by achieved by an additional retaining component, this retaining component being detachably connected to the filter housing, specifically being advantageously screwed on in combination with the filter housing.

Both of the proposals of the invention for the retaining component may entail a combination component which in addition to having a purely retaining function may also have additional functions and support appropriate functional components or functional assemblies. For example, preassembled valve assemblies may be included in the combination assembly, which valve assemblies have, e.g., permanently integrated valve bodies, while the sealing faces or valve seats matching these valves may be provided in the filter housing such that the valve is assembled in the filter housing along with the insertion of the combination component.

BRIEF DESCRIPTION OF THE DRAWINGS

The following discussion explains two embodiments of the invention based on the drawings.

FIG. 3 shows a vertical section through a second embodiment corresponding to lines A—A in FIG. 4.

FIG. 4 shows a cross-section of the embodiment of FIG. 3 corresponding to the line B—B in FIG. 3.

FIG. 5 shows a cross-section of the embodiment of FIG. 3 along line C—C of FIG. 3.

DESCRIPTION OF ILLUSTRATED EMBODIMENT

Figure 1:
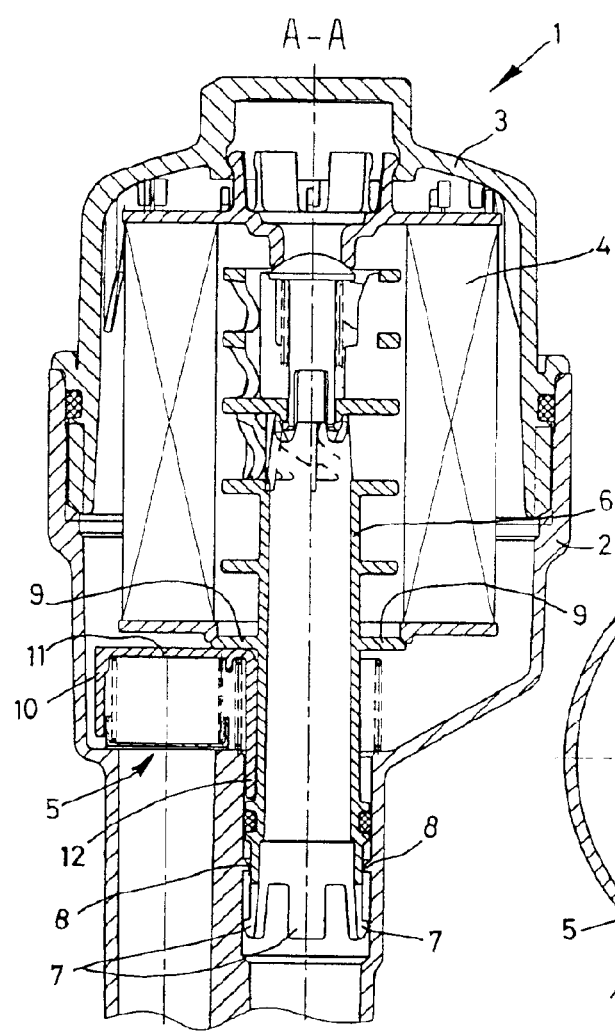
FIG. 1 shows a vertical section through a first embodiment.

Filter 1 in FIG. 1 is a filter having a filter housing 2 and a cap 3 screwed on to filter housing 2, with a replaceable filter insert 4 being provided, including the actual filter medium, for example in the form of a folded filter surface, being provided within filter 1.

Filter housing 2 is designed to be not rotationally symmetrical over its entire length, for example, due to the design restrictions of the crankcase. With certain installed components such as a valve assembly 5, for example filter 1 is thus not freely rotatable around its longitudinal axis within filter housing 2. A central component 6 is provided within filter insert 4. This component is essentially tubular in form but includes recesses which allow filtered oil to flow downward within filter insert 4 to the lubricating points of the internal combustion engine. Central component 6 is designated as a support dome since it prevents the filter material from collapsing under the pressure and temperature conditions occurring during operation. As a result, filter insert 4 is of an inexpensive design which does not require any rigid internal support device for the filter medium.

Figure 2:
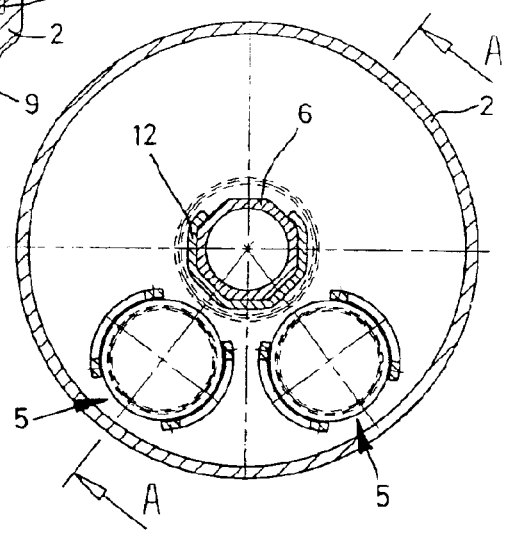
FIG. 2 shows a cross-section of the filter in FIG. 1.

At its lower end, central component 6 has multiple retaining claws 7 each of which engages a projection 8 in filter housing 2. Projections 8 are not designed as one circumferential, annular projection but as individual projections between which spaces are provided. When central component 6 rotates around its lengthwise axis relative to its operating position as shown, retaining claws 7 are allowed to pass through these spaces between projections 8 such that in this rotated position or disassembly position, central component 6 may be removed from filter housing 2. Since central component 6 has a circumferential lower collar 9, valve assembly 5 is held in the position shown by central component 6. Valve assembly 5 here is part of combination component 10 which includes multiple functional elements on base plate 11, e.g., an additional valve assembly 5, as shown in FIG. 2, which is similar or identical in design to the valve assembly shown in FIG. 1. On its base plate 11, combination component 10 additionally has fitting 12 with a roughly C-shaped cross-section. This fitting 12 surrounds central component 6—both the outer contour of central component 6 and the inner contour of fitting 12 being of polygonal design such that an anti-rotational clamping or locking is achieved in which central component 6 is retained within fitting 12, and thus within combination component 10, such that this combination component 10 is also designated as a retaining component.

When the clamping force between fitting 12 and central component 6 is exceeded, the central component may be rotated and assume its disassembly position in which it may be removed from filter housing 2 with retaining claws 7 through the spaces between projections 8. After central component 6 is removed along with its lower collar 9 from filter housing 2, retaining component 10 may also be removed such that, e.g., valve assemblies 5 may be replaced.

The polygonal design of fitting 12 and central component 6 advantageously ensures that after rotation of central component 6 into it disassembly position, this central component 6 automatically retains this rotational position—with the result that manipulation is facilitated, and the user does not need to maintain central component 6 in its rotational orientation of disassembly since this position is maintained automatically.

FIG. 3 shows a second embodiment of the innovation in which central component 6 has no retaining claws—with the result that filter housing 2 is not provided with any undercuts, and fabrication of filter housing 2 is accordingly less expensive and simpler than in the embodiment of FIG. 1. In this case, the projection engaging central component 6 is formed by retaining component 10: This retaining component 10 also has a fitting 12, and as FIGS. 4 and 5 show, this does not exhibit a polygonal contour. It extends downward over collar 14 on central component 6 such that here too central component 6 engages a projection which is fixed in place on filter housing 2, this projection being, however, formed by fitting 12 of retaining component 10, and this retaining component 10 includes a base plate 11 which supports valve assemblies 5 and screws 15 by which retaining component 10 is fastened by screws to filter housing 2. Due to this screw attachment, the projection formed by fitting 12 which engages central component 6 is similarly a filter-fixed or housing-integrated projection.

Base plate 11 of retaining component 10 has two depressions 16 which can accommodate the screw heads of screws 15. This design ensures the vertical mobility of retaining component 10 relative to filter housing 2, the screw head forming a stop for depression 16 such that retaining component 10 is permanently attached to filter housing 2.

If valve assembly 5 is intended, for example, to act as a drain valve, as shown in FIG. 3, spring 17 can lift base plate 11 and thus entire retaining component 10 after cap 3 is unscrewed such that the plate-like valve body of valve assembly 5 is lifted from its valve seat and any residual oil located within filter housing 2 can be drained—with the result that subsequent removal of filter insert 4 may be accomplished with as few drops forming and as cleanly as possible.

What is claimed is:

1. A fluid filter housing, comprising an essentially tubular central support dome which extends into an interior of the filter housing and forms a duct through which filtered fluid can flow, said central support dome being disposable in an operating position by a retaining claw engaging a projection on the filter housing and therein axially retained in the filter housing, said central support dome being detachable from said projection in a disassembly position such that said central support dome is nondestructively removable from the filter housing, wherein the central support dome is mounted rotatably around a longitudinal axis in the filter housing, and a retaining component arranged in a rotationally restricted manner within the filter housing, said retaining component having a radially inner surface that partially surrounds a radially outer surface of the central support dome, wherein the radially inner surface of the retaining component and the radially outer surface of the central support dome having matching contours that inhibit rotation of said central support dome in the operating position, the central support dome being rotatable into the disassembly position when a clamping force exerted by the retaining component upon the central support dome is exceeded.

2. The filter according to claim 1, wherein the central support dome and the retaining component (10) comprise interacting polygonal contours.

* * * * *